May 23, 1967 — PING. K. TIEN — 3,321,714
LIGHT MODULATING SYSTEM
Filed Sept. 24, 1963
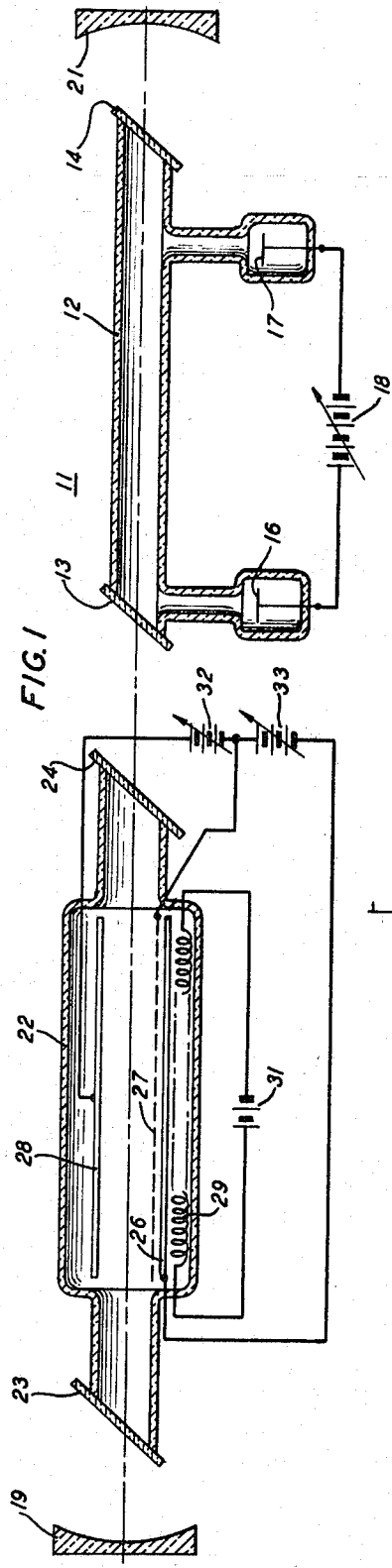
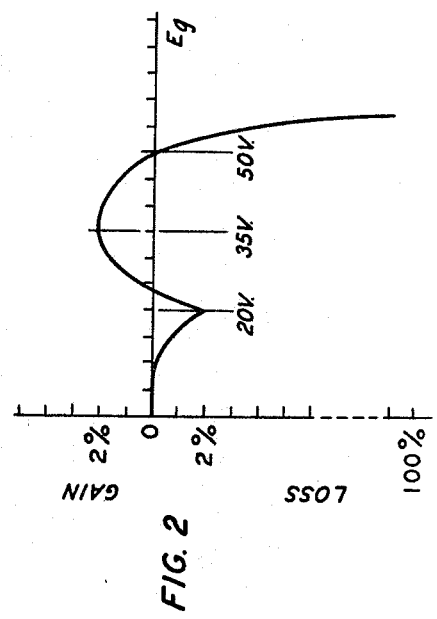
INVENTOR
P. K. TIEN
BY David P. Kelley
ATTORNEY

United States Patent Office 3,321,714
Patented May 23, 1967

3,321,714
LIGHT MODULATING SYSTEM
Ping K. Tien, Chatham Township, Morris County, N.J., assignor to Bell Telephone Laboratories, Incorporated, New York, N.Y., a corporation of New York
Filed Sept. 24, 1963, Ser. No. 311,000
6 Claims. (Cl. 331—94.5)

This invention relates to optical maser devices, and, more particularly, to an optical maser modulating arrangement.

It is well known that the amount of information which can be transmitted by coherent electromagnetic radiation varies directly as the available frequency bandwidth of the radiation employed and, for a given percentage bandwidth, the higher the frequency of radiation, the greater the total bandwidth. Until recently, the use of electromagnetic radiation at light frequencies, where, theoretically, the available bandwidth is extremely large, has not been feasible because of the incoherent nature of the light produced by light generators. The recent invention of the optical maser, which produces coherent electromagnetic waves at the frequencies of infrared and visible light has made possible the use of light frequencies, with their attendant enormous bandwidths, as information bearing radiation. In order to realize the maximum potential of the electromagnetic radiation at light frequencies, however, it is necessary that efficient apparatus for modulating the coherent light waves be provided.

Many modulation schemes have been proposed by workers in the art. One such scheme entails the use of electro-optically active substances or piezoelectric crystals. Others include the use of certain types of magnetic materials and the application of modulating magnetic fields, and Kerr cells. All of these arrangements suffer from one or more drawbacks. Most of them introduce loss into the system thereby attenuating the light, and requiring elaborate arrangements to counteract the effects of the loss; many of them require quite high modulating voltage and/or signal power, and some of them are not rapid enough in their action to give efficient, wideband, high frequency modulation.

It is an object of the present invention to modulate coherent light without attenuating the light.

It is another object of the present invention to produce modulation with very low modulating power and voltages.

It is still another object of this invention to modulate light at high frequencies with a simple, reliable structure.

These and other objects of the invention are achieved in an illustrative embodiment thereof which comprises an elongated, gas-filled triode tube positioned axially within the resonator of an optical maser, and having its axis coextensive with the axis of the maser. The electrodes of the triode extend parallel to the axis of the tube and of the maser, but displaced therefrom, leaving a clear path for the travel of the maser beam through the triode. Means for supplying a modulating voltage to the grid or anode of the triode, and means for exciting the maser to produce coherent light are supplied. When the modulating voltage is applied between the grid and anode of the triode, under appropriate conditions of gas pressure, type of gas, and applied voltage, the triode is transparent to the maser light and passes through unattenuated. A small change in modulating voltage makes the triode completely absorptive of the maser light so that none passes through. For certain values of modulating voltage, the triode is not only transparent to the maser light, it actually amplifies it.

The objects and various features of the present invention will be more clearly understood from the following detailed description, taken in conjunction with the accompanying drawings, in which:

FIG. 1 is a sectional diagrammatic view of one embodiment of the present invention, and FIG. 2 is a graph of gain versus grid voltage for one embodiment of the present invention.

Turning now to FIG. 1, there is shown a light generating and modulating arrangement which embodies the principles of the present invention. The arrangement comprises an optical maser 11 which consists of an elongated tubular member 12 containing an active medium capable of being excited to produce light. Member 12 may be a glass tube containing any one of a number of well known gases or mixtures thereof capable of being excited to produce light, or it may be a solid member, such as a ruby rod, in which case the active medium is composed of paramagnetic chromium ions contained within the ruby. In the arrangement of FIG. 1, member 12 is depicted for illustrative purposes as being a hollow glass tubular member having transparent end windows 13 and 14 which are oriented at the well known Brewster angle for polarization of the light leaving and entering the tube 12.

The gas within tube 12 is excited to its light producing state by means of a pair of electrodes 16 and 17 to which are applied a voltage difference from a voltage source 18. It is to be understood that other equally feasible means of excitation might be used, that shown here being by way of example only.

Tube 12 is contained in an optical resonator or interferometer formed by a pair of mirrors 19 and 21, shown here as having spherical reflecting surfaces, preferably spaced apart a distance close to their confocal distance. By confocal distance is meant that distance that is equal to the radius of curvature of the mirror surfaces. As is well known in the optical maser art, one of the two mirrors typically is made partially transmissive to permit the exit of light for utilization.

Positioned within the resonator formed by mirrors 19 and 21 is an elongated electron tube 22 having its longitudinal axis coextensive with the longitudinal axis of tube 12 and positioned between one end of tube 12 and mirror 19. Tube 22, which is preferably of glass, although not necessarily, has light transparent windows 23 and 24 at either end, preferably oriented at the Brewster angle. Tube 22 has positioned therein an elongated cathode electrode 26, an elongated grid electrode 27, and an elongated anode electrode 28, each of which extend parallel to the longitudinal axis of tube 22 and are spaced therefrom. The spacing between the anode 28 and grid 27 is such that the light beam from optical maser 11 directed into either end of tube 22 through windows 23 and 24 traverses an uninterrupted optical path through tube 22. Cathode 26 is heated by a filament 29 which is connected to a source of voltage 31, shown here as a battery, but which may be any one of a number of suitable heater voltage sources.

Tube 22 contains a gaseous atmosphere which may be composed of any one of a number of gases or mixtures thereof at various pressures, as will be more apparent hereinafter. Means for exciting the gas within tube 22 are shown as variable voltage sources 32 and 33 for applying voltages to the cathode 26, grid 27, and anode 28. It is to be understood that sources 32 and 33 are shown schematically for purposes of illustration, and they may, in practice, take any one of a number of forms. For example, they may be combinations of biasing sources and a modulating signal source, variable bias source, voltage pulsers or square wave generators, or any of a number of arrangements depending on the particular application of the invention.

When the electrodes have voltages applied to them, the light transmission properties of the gaseous filling vary markedly with changes in the applied voltages. In FIG.

2, there is depicted the variations in light transmission with changes in grid voltage when tube 22 has a filling consisting essentially of neon at a pressure of one millimeter of mercury at room temperature. The cathode 26 is approximately 7½ inches long and 4 millimeters wide, and maintained at zero potential. The grid is spaced from the cathode a distance of 20 mils, and the anode is spaced from the grid a distance of 5 millimeters and maintained at zero potential. From FIG. 2, it can be seen that as the grid voltage is increased from zero to 20 volts, the gas attenuates light at 1.15 microns passing therethrough until there is approximately a two percent absorption of the light. As the grid voltage is increased beyond 20 volts, the attenuation decreases until there is an approximate gain of two percent at 35 volts on the grid. At approximately 50 volts on the grid, the light passes through tube 22 with neither gain nor loss. However, beyond 50 volts on the grid attenuation or absorption of the light increases rapidly until there is approximately 100 percent absorption at a grid voltage of 55 volts.

From the foregoing, it can readily be seen that tube 22 can be made to modulate the light output of member 12 with only a small modulating voltage swing producing a one hundred percent change in light transmission through tube 22. The length of the cathode governs the amount of voltage swing necessary for complete change in light transmission. The longer the cathode, the less voltage swing required. At 1.15 microns of light, a 7½ inch cathode has been found to be sufficient for the embodiments herein discussed.

In another embodiment of the invention, tube 22 was filled with neon at a pressure of 2 torr and the maser tube 12 has a helium-neon mixture, producing light at 1.15 microns. With zero anode and cathode voltages and 27 volts on the grid, tube 22 was completely transparent. With 30 volts on the grid, tube 22 absorbed all of the light from member 12. Similar action was observed for a steady grid voltage of one volt and a voltage variation on the anode from 27 to 30 volts. With tube 22 filled with helium at 1 torr and neon at 1.5 torr and a grid voltage of 4 volts, tube 22 absorbed all of the maser light with an anode voltage of 24.5 volts, and actually produced an amplification of the maser light with an anode voltage of 25 volts. When tube 22 was filled with xenon at a pressure of ½ torr and the anode was at 13 volts, the tube 22 was completely transparent at a grid voltage of 1.2 volts and completely absorptive at a grid voltage of 1.5 volts at 2.03 microns and a 7½ inch cathode.

It is obvious from the foregoing that the electrodes can be biased to the desired operating level and the modulating voltage used to modulate the maser light output. For the xenon case, a modulating voltage swing of only 0.3 volt produces complete modulation, and only a few milliwatts of power are necessary. In addition, modulation frequencies of the order of 100 megacycles are possible.

The principles of the invention are readily applicable to other uses besides modulation, such as light switches, Q-spoil cells, or pulsers. In addition, the tube 22 can be operated as an optical maser which can be pulsed rapidly with only slight changes in grid or anode voltage. Other uses may occur to workers in the art without departing from the spirit and scope of the invention.

What is claimed is:

1. A light modulating system comprising, in combination, an optical maser comprising an elongated member containing an active medium and a pair of means external to said member forming an optical cavity resonator, a gas-filled elongated electron tube between one end of said member and one of said means, the longitudinal axis of said electron tube being coextensive with the longitudinal axis of said member, said electron tube having cathode, anode, and grid electrodes parallel to the longitudinal axis thereof, means for exciting said member to emit a beam of light, means for applying a voltage to at least one of said electrodes for varying the absorption properties of the gas to said beam, and means for varying the amplitude of the light emitted from said resonator comprising means for varying the voltage difference between at least two of said electrodes.

2. A light modulating system comprising, in combination, an optical maser comprising an elongated member containing an active medium and a pair of mirrors at either end of said member forming a cavity resonator, a gas-filled elongated electron tube between one end of said member and one of said mirrors, the longitudinal axis of said electron tube being coextensive with the longitudinal axis of said member, said electron tube having an electron emissive cathode, anode and grid electrode parallel to the longitudinal axis thereof, and defining a space for passage of a light beam longitudinally through said tube, means for exciting said member to direct a beam of light through said tube, and means for varying the amount of light passing through said tube comprising means for applying a variable voltage between said grid and anode electrodes to vary the absorption properties of the gas.

3. For use in an optical maser system, an elongated, electron tube having light transparent windows at either end thereof, and having cathode, grid, and anode electrodes extending parallel to the longitudinal axis of said tube and space therefrom to permit passage of a beam of light through said tube, said tube having a gaseous filling, the gas of said filling transmitting light unattenuated for one condition of excitation and substantially completely attenuating light for a second, different condition of excitation.

4. An electron tube as claimed in claim 3 wherein said gaseous filling comprises neon at a pressure of 2 torr.

5. An electron tube as claimed in claim 3 wherein said gaseous filling comprises helium at a pressure of 1 torr and neon at a pressure of 1.5 torr.

6. An electron tube as claimed in claim 3 wherein said gaseous filling comprises xenon at a pressure of ½ torr.

No references cited.

JEWELL H. PEDERSEN, *Primary Examiner.*

P. R. MILLER, *Assistant Examiner.*

Disclaimer 3,321,714.—*Ping K. Tien*, Chatham Township, Morris County, N.J. LIGHT MODULATING SYSTEM. Patent dated May 23, 1967. Disclaimer filed Oct. 23, 1968, by the assignee, *Bell Telephone Laboratories, Incorporated.*

Hereby enters this disclaimer to claim 3 of said patent.

[*Official Gazette May 6, 1969.*]